INVENTOR.
GILBERT R. SMITH JR.

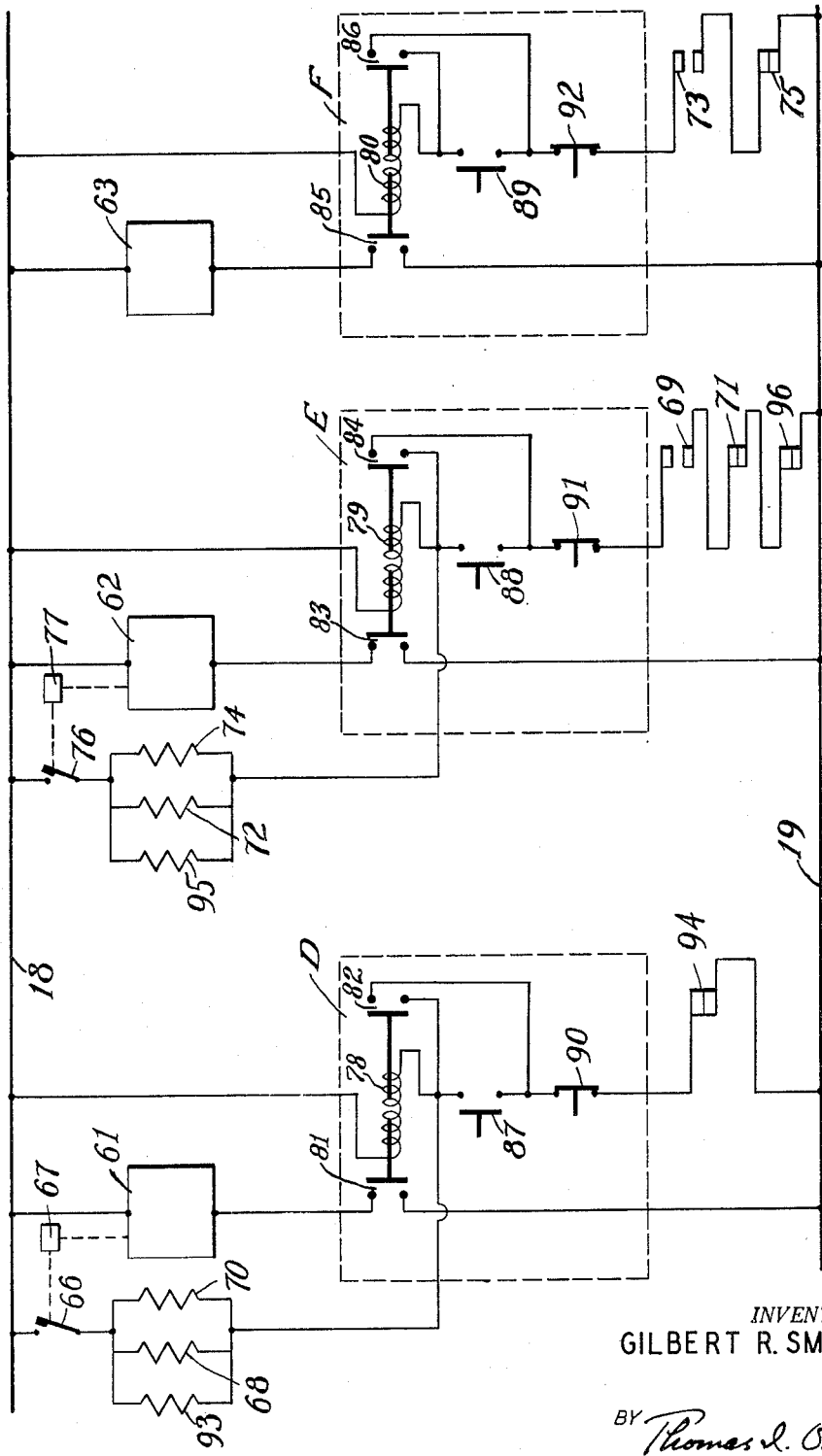

United States Patent Office 3,088,038
Patented Apr. 30, 1963

3,088,038
INTERLOCKING SYSTEM
Gilbert R. Smith, Jr., Tonawanda, N.Y., assignor to Union Carbide Corporation, a corporation of New York
Filed Jan. 26, 1961, Ser. No. 85,101
6 Claims. (Cl. 307—39)

The present invention relates to a system for interlocking independently actuated apparatus.

In industrial operations there are generally many processes in which various apparatuses are employed to feed material to, provide energy for, or otherwise operate upon other apparatuses. Although the various apparatuses perform functionally related operations, each separate apparatus is generally independently actuated and independently controlled.

For example, in many processes a number of independently actuated apparatuses are arranged to simultaneously supply material and/or energy to a receiving apparatus; under such circumstances if the receiving apparatus ceases to operate it is imperative that all the feeding apparatuses be deactuated automatically, simultaneously, and promptly.

Further in many metallurgical processes various independently actuated apparatuses are arranged in cascade. For example, a screw-feeder may be provided to supply material to a crusher; crushed material is then received by a conveyor from the crusher and transported to a storage receptacle. In the event that one of the cascaded apparatuses undergoes a failure and ceases to operate, if there is no interlocking, the remaining cascaded apparatuses will continue to operate thereby grossly disrupting the process and most probably causing damage to the apparatuses.

Accordingly, it is an object of this invention to provide an interlocking system for a plurality of independently actuated apparatuses to automatically deactuate some or all of the interlocked apparatus when a given apparatus ceases to operate.

Other objects of this invention will be apparent from the drawing and appended claims.

The interlocking system of the present invention may be employed to interlock any number of electrically actuated apparatus with any given apparatus whereby when the given apparatus ceases to operate the remaining electrically actuated apparatuses are entirely or selectively deactuated. The present invention may be broadly and more readily described, however, as a system for interlocking a first apparatus and a second apparatus to automatically deactuate the second apparatus whenever the first apparatus is not operating. Such an interlocking system comprises an electrical signal transmitting means adapted to be actuated to provide an electrical signal of predetermined magnitude when actuated, and also adapted to provide, when deactuated, an electrical signal different in magnitude by at least a definite amount from said predetermined signal; the different electrical signal may be randomly greater or less than the predetermined signal and may even be zero signal in certain modifications of the invention. The electrical signal transmitting means is arranged to be actuated by the first apparatus only during the operation thereof. A first relay is provided having an actuating element electrically connected in circuit with said electrical signal transmitting means and also having a normally closed pair of relay contacts coacting with said actuating element and being electrically connected in the actuating circuit of the second electrically actuated apparatus. A second relay is further provided having an actuating element connected in circuit with said electrical signal transmitting means and also having a normally open pair of relay contacts coacting with said actuating element and being electrically connected in the actuating circuit of the second electrically actuated apparatus.

The normally closed relay contacts of the first relay are adapted to remain closed when the predetermined signal from the transmitting means is applied to its actuating element; while the normally open relay contacts of the second relay are adapted to close when the predetermined signal from said transmitting means is applied to its actuating element. That is, whenever the first apparatus is operating, the predetermined signal from the transmitting means causes the normally open relay contacts to close while leaving the normally closed relay contacts unaffected so that the second apparatus may be actuated. However, the first and second relays are also adapted so that, whenever the first apparatus ceases to operate, if a signal greater then said predetermined signal by at least a definite amount is received by the actuating element, then the normally closed relay contacts of the first relay will open; if on the other hand when the first apparatus ceases to operate, a signal less than said predetermined signal by at least a definite amount is received by the actuating element, then the normally open relay contacts will reopen. In either case the second apparatus will be automatically deactuated.

In the practice of the present invention, the signals provided by the transmitting means may be in the form of an alternating current voltage, a direct current voltage, or in the form of pulses of electrical energy. The required difference between the predetermined signal and the signals provided by the transmitting means, when deactuated, is determined by the inherent properties and sensitivities of the relays; i.e. with some relays only a relatively small difference is required while with other relays a relatively large difference in signals may be required to cause rearrangement of the relay contacts. The present invention will function equally well with both very sensitive and less sensitive type relays as long as the relative sensitivities are considered in the selection of the signal transmitting means. In the drawing:

FIGURE 6 shows a modification of the embodiment of FIGURE 5.

Figure 1:
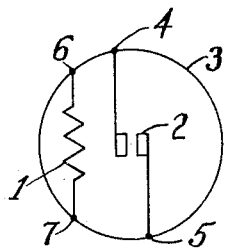
FIGURE 1 shows a type of thermally operable relay which is employed in the interlocking system of the present invention.

With reference to the drawing, FIGURE 1 shows a conventional type of thermally operable relay having a resistive actuating element 1 and a pair of normally open relay contacts 2 which are arranged to coact with actuating element 1. Relay contacts 2 and actuating element 1 are enclosed in a hermetically sealed housing 3 and are provided with terminals 4, 5, and 6, 7, respectively.

Figure 2:
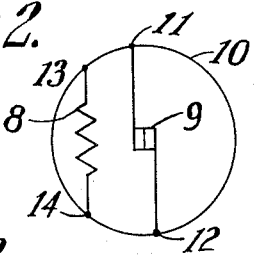
FIGURE 2 shows a second type of thermally operable relay which is employed in the interlocking system of the present invention.

FIGURE 2 shows another conventional type of thermally operable relay having a resistive actuating element 8 and a pair of normally closed relay contacts 9 which are arranged to coact with actuating element 8. Relay contacts 9 and actuating element 8 are enclosed in a hermetically sealed housing 10 and are provided with terminals 11, 12, and 13, 14, respectively.

Both of these types of relays operate according to the same principle, that of the common thermostat. The application of at least a predetermined minimum amount of electrical energy to actuating element 1, to produce at least a predetermined minimum temperature within housing 3, will cause relay contacts 2 to close. Likewise, the application of at least a predetermined minimum amount of electrical energy to actuating element 8 will cause relay contacts 9 to open. That is, a given thermally operable relay requires a predetermined minimum amount of electrical energy in order to cause rearrangement of its relay contacts. This property is characteristic of relays in general and is utilized in the present invention wherein both normally open and normally closed type relays are employed.

The normally open relay contacts of the relays employed in an interlocking system of the present invention are adapted to close when a predetermined signal is applied to their associated actuating elements, while the pairs of normally closed relays employed in the interlocking system are adapted to remain closed when the same signal is applied to their associated actuating elements. When a signal greater than the predetermined signal is applied to the actuating elements of the relays, the normally closed relay contacts are adapted to open; and when a lesser signal is applied to the actuating elements, the normally open relay contacts are adapted to re-open.

Figure 3:
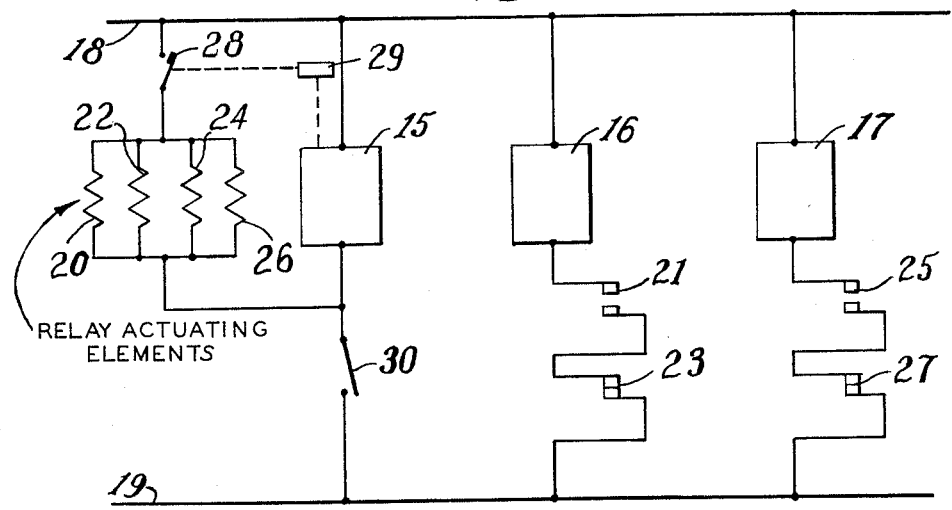
FIGURE 3 shows a schematic representation of an embodiment of the present invention.

An interlocking system employing the thermally operable relays in accordance with the present invention is shown in FIGURE 3 wherein apparatuses 15, 16, and 17 are shown adapted to be connected across electrically energized bus bars 18 and 19.

The interlocking system of FIGURE 3 is arranged so that whenever apparatus 15 is not operating, apparatus 16 and 17 are automatically deactuated.

Four thermally operable relays of the type illustrated in FIGURES 1 and 2 are shown schematically in the interlocking system of FIGURE 3; one relay comprises actuating element 20 and normally open relay contacts 21; the second relay comprises actuating element 22 and normally closed relay contacts 23; the third relay comprises actuating element 24 and normally open relay contacts 25; and the fourth relay comprises actuating element 26 and normally closed relay contacts 27. The relay contacts 21 and 23 are connected in the actuating circuit of apparatus 16; the contacts 25 and 27 are connected in the actuating circuit of apparatus 17; and all the actuating elements 20, 22, 24 and 26 are connected in circuit with "on-off" switch 28. Switch 28 is adapted to be opened and closed and is operably connected to apparatus 15 by suitable means such as mechanical linkage 29 so that when apparatus 15 is actuated by closing actuating switch 30, the "on-off" switch 28 is caused to be opened and closed at a preselected rate. It may be seen from the drawings that whenever actuating switch 30 is closed apparatus 15 is actuated and the actuating elements 20, 22, 24, and 26, and "on-off" switch 28, are connected in circuit between energized bus bars 18 and 19. Under these circumstances pulses of electrical energy of predetermined magnitude are conducted through the actuating elements 20, 22, 24, and 26 by virtue of the fact that "on-off" switch 28 is being opened and closed at a preselected rate thereby constituting an electrical pulse transmitting means. The normally closed relay contacts 23 and 27 are adapted to remain closed when the predetermined pulses are conducted through their associated actuating elements 22 and 26, while the normally open relay contacts 21 and 25 are adapted to close and remain closed when the predetermined pulses are conducted through their associated actuating elements 20 and 24. That is, the electrical energy provided by a predetermined pulse is sufficient to cause the normally open contacts, 21 and 25, to close, but it is not sufficient to cause the normally closed relay contacts, 23 and 27, to open. The frequency of the electrical pulses is arranged so that, when the normally open relay contacts are caused to close, they will remain closed, due to their inherent time lag, until the succeeding pulse of electrical energy is received by the actuating elements. The time lag of any given relay can be determined from the manufacturer's specification or by routine experimentation.

When apparatus 15 is actuated contacts 21 and 25 close and the apparatuses 16 and 17 are thereby automatically actuated. When apparatus 15 ceases to operate, for any reason, "on-off" switch 28 will no longer be opened and closed at its preselected rate. Instead it will either remain open or closed, depending on its position when the apparatus 15 ceased to operate. If switch 28 stops in the closed position electrical energy will be continuously conducted through the actuating elements in an amount greater than that provided by the predetermined pulses, i.e. the full bus bar voltage will be applied to the actuating elements. The normally closed relay contacts 23 and 27 are adapted to open when this increased amount of electrical energy is received by their associated actuating elements thereby automatically deactuating apparatuses 16 and 17.

If it happens that switch 28 stops in an open position, then no electrical energy will be received by the actuating elements and as a result, normally open contacts 21 and 25 will reopen and thereby automatically deactuate apparatuses 16 and 17.

It is thus apparent that whenever apparatus 15 ceases to operate, apparatuses 16 and 17 will be automatically deactuated and will remain deactuated until apparatus 15 is once again operating.

Figure 4:
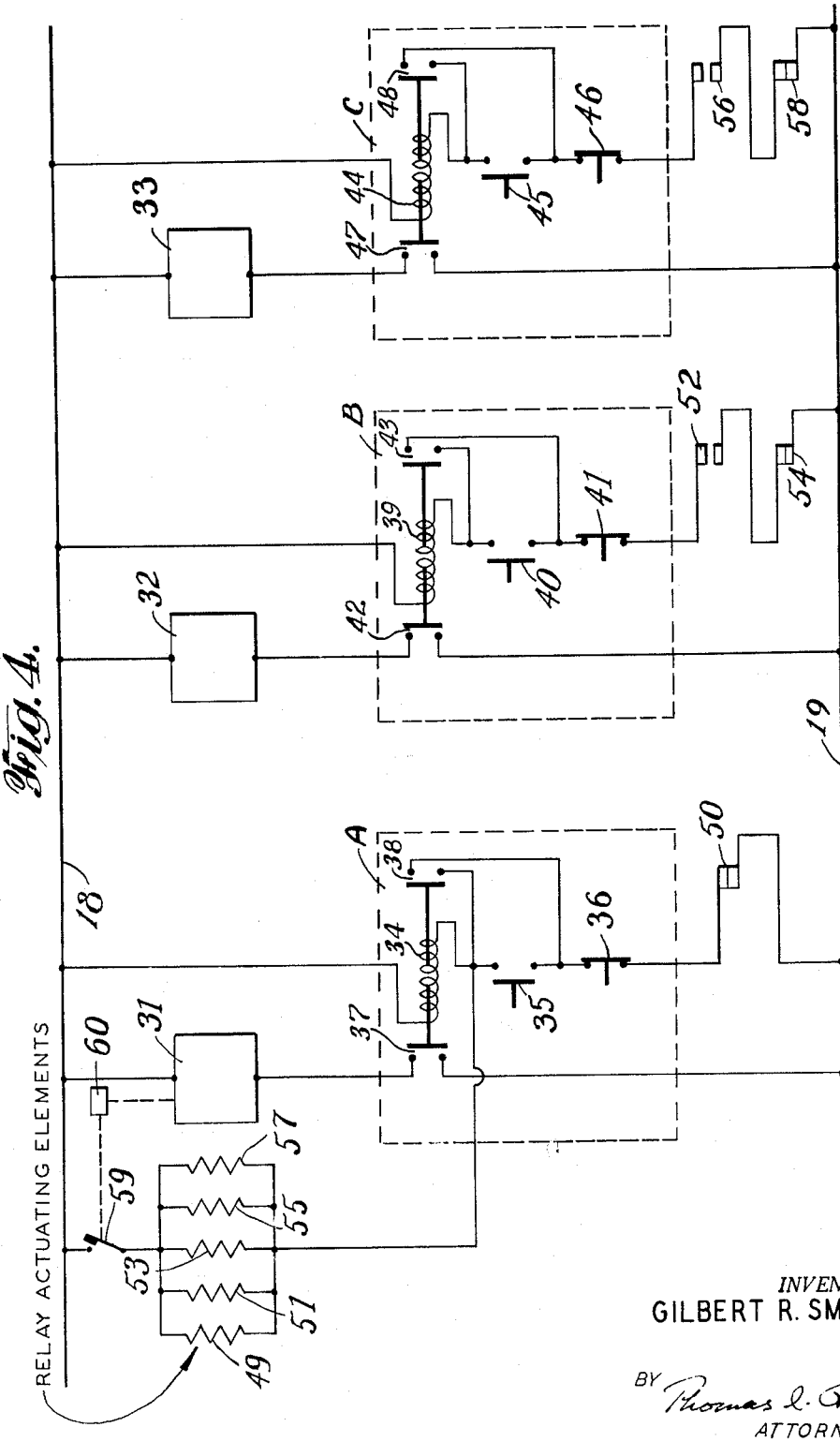
FIGURE 4 shows a schematic representation of a further embodiment of the present invention.

FIGURE 4 shows a further embodiment of the present invention. In FIGURE 4 three apparatuses 31, 32, and 33 are shown adapted to be connected across electrically energized bus bars 18 and 19. The interlocking system of FIGURE 4 is arranged so that whenever apparatus 31 is not operating, apparatuses 32 and 33 are automatically deactuated.

Apparatus 31 is adapted to be actuated when "seal in" type actuating device indicated generally as A is "set"; similarly, apparatuses 32 and 33 are adapted to be actuated when the "seal in" devices B and C are respectively "set." The "seal in" devices are commonly used in the art for actuating electrical equipment and are especially suitable for use in the interlocking system of the present invention for reasons set forth hereinbelow. The "seal in" device A comprises a coil 34, a control switch 35 normally in an open circuit position, a contact member 36 normally in a closed position and normally open contacts 37 and 38 magnetically coacting with coil 34. Apparatus 31 is actuated by momentarily closing control switch 35; when electrical current passes through coil 34, contacts 37 and 38, magnetically coacting with coil 34, automatically close and remain closed as long as current flows through coil 34; by the closing of contact 37, apparatus 31 is actuated. Whenever current ceases to flow through coil 34, contacts 37 and 38 automatically reopen and apparatus 31 is automatically deactuated and will remain in this condition until "seal in" device A is reset. When desired, apparatus 31 may be deactuated by moving contact member 36 momentarily to an open circuit position. "Seal in" devices B and C are operable in the same manner as "seal in' device A and are arranged to be adapted to actuate apparatuses 32 and 33 respectively. "Seal in" device B comprises coil 39, a control switch 40, a contact member 41, and contacts 42 and 43 magnetically coacting with coil 39; "seal in" device C comprises coil 44, a control switch 45, a contact member 46, and contacts 47 and 48 magnetically coacting with coil 44.

Five thermally operable relays are illustrated schematically in FIGURE 4; one relay comprises actuating element 49 and normally closed relay contacts 50; the second relay comprises actuating element 51 and normally open relay contacts 52; the third relay comprises actuating element 53 and normally closed relay contacts 54; the fourth relay comprises actuating element 55 and normally open relay contacts 56; the fifth relay comprises actuating element 57 and normally closed relay contacts 58. All the actuating elements 49, 51, 53, 55, and 57 are connected in circuit with "on-off" switch 59 which is operably connected to apparatus 31 by mechanical linkage 60. Normally closed relay contacts 50 are connected in circuit with the control switch 35 of "seal in" device A; normally open relay contacts 52 and normally closed contacts 54 are connected in circuit with the control switch 40 of "seal in" device B; and, normally open relay contacts 56 and normally closed relay contacts 58 are connected in circuit with the control switch 45 of "seal in" device C.

When the control switch 35 of "seal in" device A is momentarily closed to thereby cause contacts 37 and 38 to close, apparatus 31 is actuated and the actuating elements 49, 51, 53, 55, and 57 are connected in circuit between bus bars 18 and 19. Under these circumstances, predetermined pulses of electrical energy are conducted through the actuating elements and, in the manner of the system of FIGURE 3, the normally open relay contacts 52 and 56 close, and the normally closed relay contacts 50, 54, and 58 remain closed.

Under the circumstances whereby relay contacts 52 and 56 assume a closed position, apparatuses 32 and 33 may be actuated by momentarily closing contacts 40 and 45 respectively.

When apparatus 31 ceases to operate for any reason, "on-off" switch 59 will no longer be opened and closed at its preselected rate, i.e. it will either remain open or closed. If switch 59 stops in the closed position, electrical energy will be continuously conducted through the actuating elements in an amount greater than that provided by the predetermined pulses. The normally closed relay contacts 54 and 58 are adapted to open under these circumstances thereby automatically deactuating apparatus 32 and 33; in addition, relay contacts 50 are adapted to open under the same circumstances thereby removing the continuous electrical signal from the actuating elements and thus eliminating the possibility of overheating the actuating elements and also improving the efficiency of the interlocking system. When the relay contacts 50, 54, and 58 open, the "seal in" devices A, B, and C automatically open and must be re-set before the apparatuses can be once again actuated.

If it happens that switch 59 stops in an open position, then no electrical energy will be received by the actuating elements and as a result normally open contacts 52 and 56 will reopen and thereby automatically deactuate apparatuses 32 and 33. When relay contacts 52 and 56 open, the "seal in" devices B and C automatically open and must be re-set before the apparatuses 32 and 33 can be once again actuated.

It will be obvious to those skilled in the art that in the interlocking system of FIGURE 4 it is possible to eliminate the "seal in" devices B and C and arrange apparatus 32 directly in circuit with relay contacts 52 and 54 and apparatus 33 directly in circuit with relay contacts 56 and 58 without losing the advantages of the present invention.

In the preferred form of the interlocking system of FIGURE 4, the normally closed relay contacts 50 connected in circuit with the "on-off" switch 59 are adapted to open simultaneously with or subsequent to the opening of relay contacts 54 and 58 under the circumstances that an increased amount of electrical energy is received by the actuating elements when "on-off" switch 59 stops in the closed position. This arrangement minimizes any delay in the deactuation of apparatuses 32 and 33 resulting from the inherent "time lag" which is characteristic of relays in general. The "time lag" of a relay is the time required for the contacts to be rearranged after a sufficient amount of electrical energy has been applied to the actuating element of the relay for this purpose; the "time lag" or "time delay" of some relays may be as much as 15 seconds or more, although it is usually much less than 15 seconds.

The advantages of the above described arrangement are illustrated in the following example:

*Example 1*

The electrically actuated apparatuses shown in FIGURE 4, which represent electric motor driven mechanisms are set in normal operation by first momentarily closing control switch 25 so that contacts 37 and 38 magnetically coacting therewith are closed. Apparatus 31 is thereby actuated; "on-off" switch 59 is driven by apparatus 31 through linkage 60 at a preselected rate and pulses of electrical energy are transmitted to actuating elements 49, 51, 53, 55, and 57. Relay contacts 52 and 56 are closed due to the pulses of energy transmitted to their coacting actuating elements 51 and 55. Apparatuses 32 and 33 are now actuated by momentarily closing control switches 40 and 45 so that contacts 42, 43, 47, and 48 are closed. Relay contacts 50, 54, and 58 remain closed while pulses of electrical energy are transmitted to their actuating elements since the predetermined pulses of electrical energy are sufficient only to cause relay contacts 52 and 56 to close, and are not sufficient to cause relay contacts 50, 54, and 58 to open. The relay contacts 52, 54, 56, and 58 of the thermally operable relays each have an inherent time delay of 4 seconds and the inherent time delay of relay contacts 50 is 5 seconds. Upon the occurrence of a malfunction of apparatus 31 which causes "on-off" switch 59 to stop in a closed position whereby the actuating elements receive an increased amount of electrical energy, apparatuses 32 and 33 are deactuated within 4 seconds when relay contacts 54 and 58 assume an open position to thereby cause contacts 42, 43, 47, and 48 to open; then 1 second later relay contacts 50 open to discontinue the application of electrical energy to the actuating elements. That is, the apparatuses 32 and 33 are deactuated within 4 seconds from the time of the malfunction of apparatus 31, and the actuating elements receive electrical current continuously for a maximum of only 5 seconds. If, on the other hand, relay contacts 50 were adapted to open before relay contacts 54 and 58, for example, 3 seconds after an occurrence of a malfunction, then at this time all power would be removed from the actuating elements and 4 seconds later relay contacts 52 and 56 would open to deactuate apparatuses 32 and 33, thus requiring a total of 7 seconds to deactuate feeding apparatus 32 and 33. In actual practice it might take longer than the assumed 4 seconds for relay contacts 52 and 56 to open since the continuous application of electrical energy to their associated actuating elements might produce a temperature whereby the time-delays of the relay contacts are increased to greater than 4 seconds.

In the foregoing example, if a malfunction caused the actuating elements to receive no electrical energy, i.e. if "on-off" switch stops in the open position, then feeding apparatuses 32 and 33 would be deactuated in 4 seconds.

Figure 5:
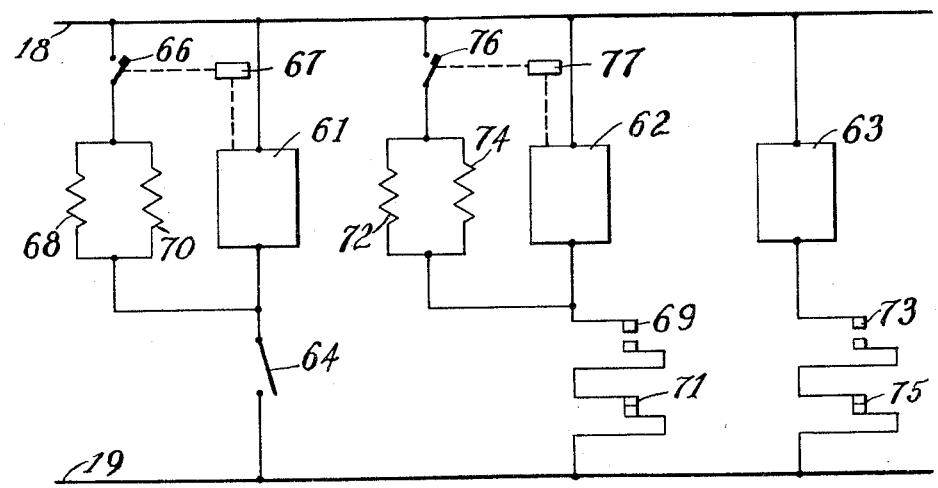
FIGURE 5 shows a schematic representation of an embodiment of the present invention especially suitable for the interlocking of cascaded apparatuses.

A further embodiment of the present invention is illustrated in FIGURE 5 wherein apparatuses 61, 62, and 63 are shown adapted to be connected across energized bus bars 18 and 19. The interlocking system of FIGURE 5 is arranged so that whenever apparatus 62 is not operating, apparatus 63 is automatically deactuated, and whenever apparatus 61 is not operating apparatuses 62 and 63 are automatically deactuated. This type of arrangement is useful in the interlocking of apparatuses which are arranged in cascade; since, in the event of a malfunction of one of the cascaded apparatuses, only the apparatuses feeding the inoperative apparatus are deactuated thereby avoiding the unnecessary delay that would result if all the apparatuses were deactuated as a result of the malfunction.

In the embodiment of FIGURE 5, "on-off" switch 66 is operably coupled to apparatus 61 through linkage 67. Two thermally operable relays comprising respectively, actuating element 68 and normally open relay contacts 69, and actuating element 70 and normally closed relay contacts 71, are arranged so that their relay contacts 69 and 71 are connected in circuit with apparatus 62 and so that their actuating elements are connected in circuit with "on-off" switch 66. The operation of these relays is as described above in connection with other embodiments of this invention; i.e. when switch 64 is closed to actuate apparatus 61, predetermined pulses of electrical energy are received by the actuating elements 68 and 70 and normally open relay contacts 69 are thereby caused to close while normally closed relay contacts 71 remain closed. Under these circumstances, apparatus 62 is automatically actuated.

Two other thermally operable relays are provided comprising actuating element 72 and normally open relay contacts 73, and actuating element 74 and normally closed relay contact 75 respectively. The actuating elements 72 and 74 are connected in circuit with "on-off" switch 76 which is operably coupled to apparatus 62 through linkage 77; and relay contacts 73 and 75 are connected in circuit with apparatus 63. Thus, when apparatus 62 is actuated upon the closing of relay contacts 69, predetermined pulses of electrical energy are received by actuating elements 72 and 74, and normally open relay contacts 73 are thereby caused to close while normally closed relay contacts 75 remain closed. Under these circumstances, apparatus 63 is automatically actuated.

Whenever apparatus 62 ceases to operate, for any reason, apparatus 63 will be automatically deactuated by the re-opening of normally open relay contacts 73 or by the opening of normally closed relay contacts 75. Likewise, if apparatus 61 should cease to operate, both apparatus 62 and 63 will be automatically and successively deactuated.

FIGURE 6 shows a modification of the embodiment of FIGURE 5. In FIGURE 6 apparatuses 61, 62, and 63 are shown adapted to be connected across electrically energized bus bars 18 and 19 through "seal in" devices D, E, and F respectively.

The "seal in" devices D, E, and F respectively comprise coils 78, 79, and 80; contacts 81 and 82, 83 and 84, and 85 and 86; control switches 87, 88, and 89; and contact members 90, 91, and 92. "Seal in" devices D, E, and F are operable in the same manner as "seal in" devices A, B, and C which have been previously described.

Two additional normally closed thermally operable relays are provided in the interlocking system of FIGURE 6; one relay having its actuating element 93 connected in circuit with "on-off" switch 66 and having its normally closed relay contacts 94 in circuit with control switch 87 of "seal in" device D; the other additional relay is arranged having its actuating element 95 connected in circuit with "on-off" switch 76 and having its normally closed relay contacts 96 in circuit with control switch 88 of "seal in" device E. Relay contacts 94 are adapted to open when its associated actuating element 93 receives an increased amount of electrical energy, i.e. whenever apparatus 61 ceases to operate and causes "on-off" switch 66 to stop in a closed position. Similarly, relay contacts 96 are adapted to open whenever "on-off" switch 76 is caused to stop in a closed position by a malfunction of apparatus 62. The opening of contacts 94 removes all electrical energization from actuating elements 93, 68, and 70 and the opening of contacts 96 removes all electrical energization from actuating elements 95, 72, and 74.

It is apparent from the drawing and the previous disclosure that the interlocking system of FIGURE 6, which operates in substantially the same manner as the embodiment of FIGURE 5, has the added advantage that the actuating elements of the relays will be subjected to an increased electrical signal for only short periods of time under any conditions of operation or malfunction of the interlocked apparatuses.

It will also be obvious to those skilled in the art that in the interlocking system of FIGURE 6 it is possible to eliminate "seal in" device F and arrange apparatus 63 directly in circuit with relay contacts 73 and 75 across bus bars 64 and 65 without losing the advantages of the present invention. However, since apparatus requiring any appreciable amount of electrical energy are most often energized through "seal in" type devices, these devices have been illustrated in FIGURE 6, and also in FIGURE 4, to show the adaptability of the present invention, and to conform to the usual practice.

A still further embodiment of the present invention employs as a pulse transmitting means an electrical switch which can be electrically energized and mechanically driven to open and close at a preselected rate to provide predetermined pulses of electrical energy and which, by virtue of its design, always opens when not being mechanically driven. An example of this type of switch is the Honeywell Mercury Pulse Switch, Series AS702B. With reference to FIGURE 3, when employing this type of switch, the relays comprising contacts 23 and 27 and actuating elements 22 and 26 can be eliminated; and in the system of FIGURE 5, contacts 71 and 75 and actuating elements 70 and 74 can likewise be eliminated since whenever a malfunction occurs no signal will be transmitted by the switch coupled to the inoperable apparatus and any relay having its actuating element in circuit with the switch will reopen.

Although the present invention has been described with a certain degree of particularity it is to be understood that this is not intended to limit the scope of this invention.

In the practice of the present invention all types of electrically actuated apparatus can be interlocked and the various apparatus to be interlocked may be energized from individual electrical power sources, or from the same power source as illustrated in the drawing. Moreover, many types of relay devices and electrical pulse transmitting means, other than those described hereinabove, may be used in the interlocking system of this invention so long as the combination thereof is adapted to provide a predetermined electrical signal to close the normally open relay contacts of the interlocking system when the interlocked apparatuses are functioning properly; and, upon the occurrence of a malfunction of an interlocked apparatus, providing a signal different from the predetermined signal by at least a definite amount to cause reopening of the normally open relay contacts, or opening of the normally closed relay contacts.

What is claimed is:

1. A system for interlocking a first apparatus and a second electrically actuated apparatus to automatically deactuate the second apparatus when the first apparatus is not operating, said interlocking system comprising electrical signal transmitting means adapted to be actuated to provide an electrical signal of predetermined magnitude and adapted to provide an electrical signal different in magnitude by at least a definite amount from said predetermined signal when deactuated and being arranged to be actuated by the first apparatus during the operation thereof; a first relay having an actuating element electrically connected in circuit with said electrical signal transmitting means and having a normally closed pair of relay contacts coacting with said actuating element and electrically connected in the actuating circuit of the second apparatus; a second relay having an actuating element electrically connected in circuit with said electrical signal transmitting means and having a normally open pair of relay contacts electrically connected in the actuating circuit of the second apparatus; said normally closed pair of relay contacts of said first relay being adapted to remain closed when said predetermined electrical signal is applied to the actuating element of said first relay and being adapted to open when an electrical signal, greater than said predetermined signal by at least said definite amount, is applied to the actuating element of said first relay; and said normally open pair of contacts of said second relay being adapted to close when said predetermined electrical signal is applied to the actuating element of said second relay and being adapted to open when an electrical signal, less than said predetermined signal by at least said definite amount, is applied to the actuating element of said second relay.

2. A system for interlocking a first apparatus and a second apparatus to automatically deactuate the second apparatus when the first apparatus is not operating, said interlocking system comprising electrical switch means connected in circuit with a source of electrical energy having a substantially constant predetermined magnitude, said switch means being adapted to be closed and opened to thereby make and break contact with the electrical energy source and being operably coupled to the first apparatus to be opened and closed at a preselected rate during the operation of the first apparatus to thereby provide a means for transmitting predetermined pulses of electrical energy; a first thermally operable relay having an actuating element electrically connected in circuit with said switch means and a normally closed pair of contacts coacting with said actuating element and electrically connected in the actuating circuit of the second apparatus; a second thermally operable relay having an actuating element electrically connected in circuit with said switch means and a normally open pair of contacts coacting with said actuating element and electrically connected in the actuating circuit of the second apparatus; said normally closed pair of contacts of said first relay being adapted to remain closed when said predetermined pulses of electrical energy are transmitted to the actuating element of said first relay from said switch means and being adapted to open when said first switch is continuously closed whereby electrical energy at said constant predetermined magnitude is continuously transmitted to said actuating element of said first relay; said normally open pair of relay contacts of said second relay being adapted to close when said predetermined pulses of electrical energy are transmitted to the actuating element of said second relay from said switch means and being adapted to open when said switch means is continuously open whereby no electrical energy is transmitted to the actuating element of said second relay.

3. A system for interlocking a first and a second electrically actuated apparatus to automatically deactuate the second apparatus when the first apparatus is not operating, the first apparatus having a normally open control switch in the actuating circuit thereof said control switch being adapted to be closed to conduct electrical current for the actuation of the first apparatus and being adapted to open automatically when current ceases to be conducted therethrough; said interlocking system comprising electrical signal transmitting means adapted to be actuated to provide an electrical signal of predetermined magnitude and adapted to provide an electrical signal different in magnitude by at least a definite amount from said predetermined signal when deactuated and being arranged to be actuated by the first apparatus during the operation thereof; a first relay having an actuating element electrically connected in circuit with said electrical signal transmitting means and a normally closed pair of relay contacts coacting with said actuating element and electrically connected in circuit with the control switch of the first apparatus; a second relay having an actuating element electrically connected in circuit with said electrical signal transmitting means and a normally closed pair of contacts coacting with said actuating element and electrically connected in the actuating circuit of the second apparatus; a third relay having an actuating element electrically connected in circuit with said electrical signal transmitting means and a normally open pair of contacts coacting with said actuating element and electrically connected in the actuating circuit of the second apparatus; said normally closed pairs of relay contacts of said first and second relays being adapted to remain closed when said predetermined electrical signal is received by the actuating elements of said first and second relay and being adapted to open simultaneously when an electrical signal, greater than said predetermined signal by at least a definite amount, is received by the actuating elements of said first and second relays; and said normally open pair of contacts of said third relay being adapted to close when said predetermined electrical signal is received by the actuating elements of said third relay and being adapted to open when an electrical signal, less than said predetermined signal by at least said definite amount, is applied to the actuating element of the third relay.

4. A system for interlocking a first and a second electrically actuated apparatus to automatically deactuate the second apparatus when the first apparatus is not operating, the first apparatus having a normally open control switch in the actuating circuit thereof said control switch being adapted to be closed to conduct electrical current for the actuation of the first apparatus and being adapted to open automatically when current ceases to be conducted therethrough; said interlocking system comprising electrical signal transmitting means adapted to be actuated to provide an electrical signal of predetermined magnitude and adapted to provide an electrical signal different in magnitude by at least a definite amount from said predetermined signal when deactuated and being arranged to be actuated by the first apparatus during the operation thereof; a first relay having an actuating element electrically connected in circuit with said electrical signal transmitting means and a normally closed pair of relay contacts coacting with said actuating element and electrically connected in circuit with the control switch of the first apparatus; a second relay having an actuating element electrically connected in circuit with said electrical signal transmitting means and a normally closed pair of contacts coacting with said actuating element and electrically connected in the actuating circuit of the second apparatus; a third relay having an actuating element electrically connected in circuit with said electrical signal transmitting means and a normally open pair of contacts coacting with said actuating element and electrically connected in the actuating circuit of the second apparatus; said normally closed pairs of relay contacts of said first and second relays being adapted to remain closed when said predetermined electrical signal is received by the actuating elements of said first and second relay and being adapted to open when an electrical signal, greater than said predetermined signal by at least a definite amount, is received by the actuating elements of said first and second relays, the contacts of said second relay being adapted to open prior to the contacts of said first relay; and said normally open pair of contacts of said third relay being adapted to close when said predetermined electrical signal is received by the actuating elements of said third relay and being adapted to open when an electrical signal, less than said predetermined signal by at least said definite amount, is applied to the actuating element of the third relay.

5. A system for interlocking a first and a second electrically actuated apparatus to automatically deactuate the second apparatus when the first apparatus is not operating, the first apparatus having a normally open control switch in the actuating circuit thereof said control switch being adapted to be closed to conduct electrical current for the actuation of the first apparatus and being adapted to open automatically when current ceases to be conducted therethrough; said interlocking system comprising a switch means connected in circuit with a source of electrical energy having a substantially constant predetermined magnitude, said switch being adapted to be closed and opened to thereby make and break contact with the electrical energy source and being operably coupled to the first apparatus to be opened and closed at a preselected rate during the operation of the first apparatus to thereby provide a means for transmitting predetermined pulses of electrical energy; a first thermally operable relay having an actuating element electrically connected in circuit with said switch means and a normally closed pair of contacts coacting with said actuating element and connected in circuit with the control switch of the first apparatus; a second thermally operable relay having an actuating element electrically connected in circuit with said switch means and a normally closed pair of relay contacts coacting with said actuating element and connected in the actuating circuit of the second apparatus; a third thermally operable relay having an actuating element electrically connected in circuit with said switch means and a normally open pair of relay contacts coacting with said actuating element and connected in the actuating circuit of the second apparatus; said normally closed pairs of relay contacts of said first and second thermally operable relays being adapted to remain closed when said predetermined pulses of electrical energy are transmitted to the actuating elements of said first and second relays and being adapted to open simultaneously when said switch means is continuously closed whereby electrical energy at said constant predetermined magnitude is continuously transmitted to said actuating elements of said first and second relays; said normally open pair of contacts of said third relay being adapted to close when said predetermined pulses of electrical energy are transmitted to the actuating element of said third relay and being adapted to open when said switch means is continuously open whereby no electrical energy is transmitted to the actuating element of said third relay.

6. A system for interlocking a first and a second electrically actuated apparatus to automatically deactivate the second apparatus when the first apparatus is not operating, the first apparatus having a normally open control switch in the actuating circuit thereof said control switch being adapted to be closed to conduct electrical current for the actuation of the first apparatus being adapted to open automatically when current ceases to be conducted therethrough; said interlocking system comprising an electrical switch means connected in circuit with a source of electrical energy having a substantially constant predetermined magnitude, said switch being adapted to be closed and opened to thereby make and break contact with the electrical energy source and being operably coupled to the first apparatus to be opened and closed at a preselected rate during the operation of the first apparatus to thereby provide a means for transmitting predetermined pulses of electrical energy; a first thermally operable relay having an actuating element electrically connected in circuit with said switch means and a normally closed pair of contacts coacting with said actuating element and connected in circuit with the control switch of the first apparatus; a second thermally operable relay having an actuating element electrically connected in circuit with said switch means and a normally closed pair of relay contacts coacting with said actuating element and connected in the actuating circuit of the second apparatus; a third thermally operable relay having an actuating element electrically connected in circuit with said switch means and a normally open pair of relay contacts coacting with said actuating element and connected in the actuating circuit of the second apparatus; said normally closed pairs of relay contacts of said first and second thermally operable relays being adapted to remain closed when said predetermined pulses of electrical energy are transmitted to the actuating elements of said first and second relays and being adapted to open when said switch means is continuously closed whereby electrical energy at said constant predetermined magnitude is continuously transmitted to said actuating elements of said first and second relays; the contacts of said second relay being adapted to open prior to the contacts of the first relay; and said normally open pair of contacts of said third relay being adapted to close when said predetermined pulses of electrical energy are transmitted to the actuating element of said third relay and being adapted to open when said switch means is continuously open whereby no electrical energy is transmitted to the actuating element of said third relay.

References Cited in the file of this patent
UNITED STATES PATENTS

| | | |
|---|---|---|
| 1,728,283 | Fisher | Sept. 17, 1929 |
| 2,387,889 | Dorfman | Oct. 30, 1945 |
| 2,555,880 | Fruechtel | June 5, 1951 |
| 2,611,796 | Conangla | Sept. 23, 1952 |